(12) United States Patent
Janssen et al.

(10) Patent No.: US 12,185,443 B2
(45) Date of Patent: Dec. 31, 2024

(54) SELECTING LIGHTING DEVICES FOR RENDERING ENTERTAINMENT LIGHTING BASED ON RELATIVE DISTANCE INFORMATION

(71) Applicant: SIGNIFY HOLDING B.V., Eindhoven (NL)

(72) Inventors: Niek Marcellus Cornelis Martinus Janssen, Eindhoven (NL); Tobias Borra, Rijswijk (NL)

(73) Assignee: SIGNIFY HOLDING B.V., Eindhoven (NL)

( * ) Notice: Subject to any disclaimer, the term of this patent is extended or adjusted under 35 U.S.C. 154(b) by 167 days.

(21) Appl. No.: 18/015,841

(22) PCT Filed: Jul. 12, 2021

(86) PCT No.: PCT/EP2021/069278
§ 371 (c)(1),
(2) Date: Jan. 12, 2023

(87) PCT Pub. No.: WO2022/013131
PCT Pub. Date: Jan. 20, 2022

(65) Prior Publication Data
US 2023/0269852 A1 Aug. 24, 2023

(30) Foreign Application Priority Data

Jul. 13, 2020 (EP) ...................................... 20185422

(51) Int. Cl.
*H05B 47/155* (2020.01)
*H05B 47/19* (2020.01)

(52) U.S. Cl.
CPC ........... *H05B 47/155* (2020.01); *H05B 47/19* (2020.01)

(58) Field of Classification Search
CPC .... H05B 47/155; H05B 47/19; H05B 47/165; Y02B 20/40
(Continued)

(56) References Cited

U.S. PATENT DOCUMENTS 7,333,903 B2 * 2/2008 Walters .................. H04L 67/52
702/183
8,467,001 B2 * 6/2013 Chen ................ H04N 21/43615
348/460
(Continued)

FOREIGN PATENT DOCUMENTS

EP 2605622 A2 6/2013
WO 2004006578 A2 1/2004
(Continued)

*Primary Examiner* — Ryan Jager

(57) ABSTRACT

A device (11) for providing audio and/or video content to a media rendering device over a physical connection and controlling one or more wireless lighting devices (31,32) to render light effects based on an analysis of the audio and/or video content is configured to obtain relative distance information (201-204). The relative distance information is indicative of distances between the device and each of a plurality of wireless lighting devices (31-34). The device is further configured to select, based on the relative distance information, the one or more wireless lighting devices from the plurality of wireless lighting devices, perform the analysis of the audio and/or video content, determine the light effects based on the analysis of the audio and/or video content, and control the selected one or more wireless lighting devices to render the light effects.

9 Claims, 5 Drawing Sheets

(58) Field of Classification Search
USPC .......................................................... 315/297
See application file for complete search history.

(56) References Cited

U.S. PATENT DOCUMENTS

| | | | | |
|---|---|---|---|---|
| 10,653,951 | B2* | 5/2020 | Aliakseyeu | ............ A63F 13/212 |
| 10,813,192 | B2* | 10/2020 | Hubbers | .............. H05B 47/155 |
| 10,973,109 | B2* | 4/2021 | Feil | ........................ H05B 47/19 |
| 2006/0058925 | A1* | 3/2006 | Diederiks | .......... H04N 21/4131 |
| | | | | 348/E5.12 |
| 2015/0369618 | A1* | 12/2015 | Barnard | .................. H04W 4/70 |
| | | | | 701/491 |
| 2023/0269852 | A1* | 8/2023 | Janssen | ................ H05B 47/155 |
| | | | | 315/297 |

FOREIGN PATENT DOCUMENTS

| | | | |
|---|---|---|---|
| WO | 2014187717 | A1 | 11/2014 |
| WO | 2020114756 | A1 | 6/2020 |
| WO | 2020114812 | A1 | 6/2020 |

\* cited by examiner

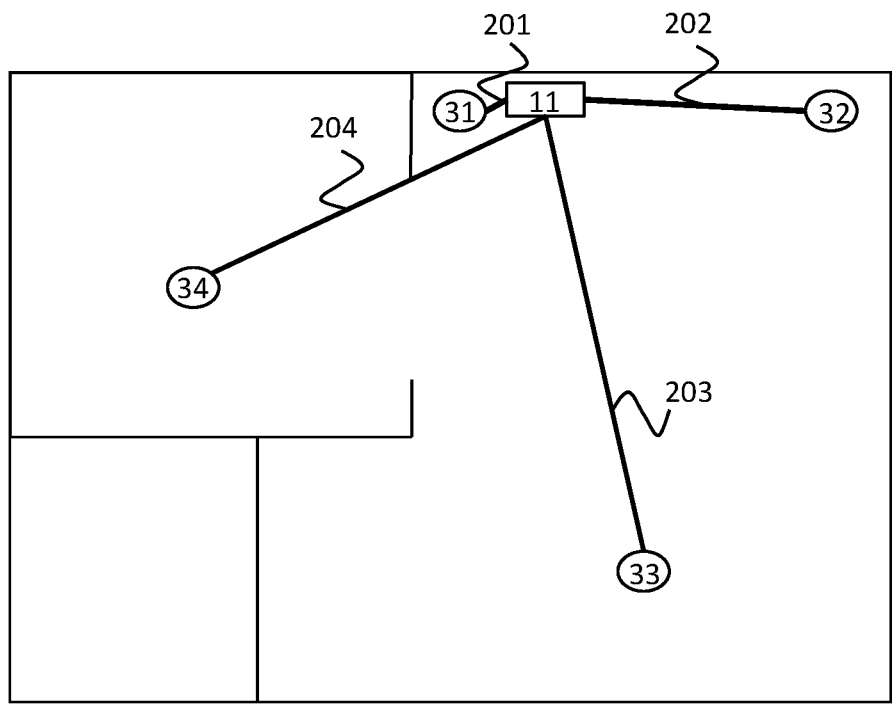
Fig. 5
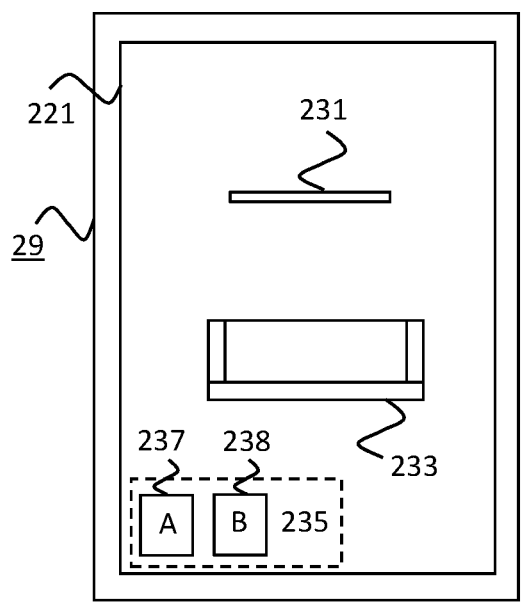 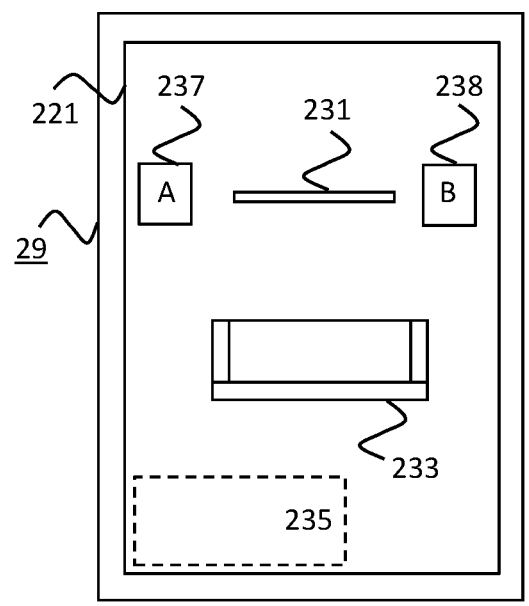
Fig. 6    Fig. 7

SELECTING LIGHTING DEVICES FOR RENDERING ENTERTAINMENT LIGHTING BASED ON RELATIVE DISTANCE INFORMATION

CROSS-REFERENCE TO PRIOR APPLICATIONS

This application is the U.S. National Phase application under 35 U.S.C. § 371 of International Application No. PCT/EP2021/069278, filed on Jul. 12, 2021, which claims the benefit of European Patent Application No. 20185422.1, filed on Jul. 13, 2020. These applications are hereby incorporated by reference herein.

FIELD OF THE INVENTION

The invention relates to a device for providing audio and/or video content to a media rendering device over a physical connection and controlling one or more wireless lighting devices to render light effects based on an analysis of said audio and/or video content while said audio and/or video content is being rendered on said media rendering device.

The invention further relates to a method of controlling one or more wireless lighting devices to render light effects based on an analysis of audio and/or video content while said audio and/or video content is being rendered on a media rendering device.

The invention also relates to a computer program product enabling a computer system to perform such a method.

BACKGROUND OF THE INVENTION

Philips' Hue Entertainment and Hue Sync have become very popular among owners of Philips Hue lights. Philips Hue Sync enables the rendering of light effects based on the content that is played on a computer, e.g. video games. A dynamic lighting system can dramatically influence the experience and impression of audio-visual material, especially when the colors sent to the lights match what would be seen in the composed environment around the screen.

This new use of light can bring the atmosphere of a video game or movie right into the room with the user. For example, gamers can immerse themselves in the ambience of the gaming environment and enjoy the flashes of weapons fire or magic spells and sit in the glow of the force fields as if they were real. Hue Sync works by observing analysis areas of the video content and computing light output parameters that are rendered on Hue lights around the screen. When the entertainment mode is active, the selected lighting devices in a defined entertainment area will play light effects in accordance with the content depending on their positions relative to the screen.

Initially, Hue Sync was only available as an application for PCs. An HDMI module called the Hue Play HDMI Sync Box was later added to the Hue entertainment portfolio. This device addresses one of the main limitations of Hue Sync and aims at streaming and gaming devices connected to the TV. It makes use of the same principle of an entertainment area and the same mechanisms to transport information. This device is in principle a HDMI splitter which is placed between any HDMI device and TV.

Currently, configuring the entertainment mode is performed in the same way for the Hue Play HDMI Sync Box as for the Hue Sync application. In the Philips Hue main app, the user selects which lights in what rooms should be part of the entertainment area and drags them to the relative position versus the screen. Whereas in the method disclosed in US2006/0058925 A1 the positions of the lights are used to determine a brightness setting for the lights, in Hue Sync, the position of a light determines which region of the video is to be analyzed for determining at least color settings for the entertainment light effects.

The user can then test the experience before finalizing the entertainment area and having it stored in the Hue bridge. With every new change that a consumer wants, for instance removing or adding a new light, the user needs to change the entertainment area again and select or deselect the specific light. Furthermore, in case a user wants different configurations, more entertainment areas need to be created.

The correct layout and configuration of the entertainment mode, and newly added lights thereto, is important, especially since light behavior is normally largely dependent on position in the room relative to the screen. However, some users experience the process of manually adding lights to the entertainment area(s) in the Hue app to be cumbersome, especially users that first add all their lights to an entertainment area and then remove some of them again after discovering that having all their lights in the entertainment area does not lead to the best entertainment experience.

SUMMARY OF THE INVENTION

It is a first object of the invention to provide a device, which allows an entertainment mode to be configured with less effort.

It is a second object of the invention to provide a method, which allows an entertainment mode to be configured with less effort.

In a first aspect of the invention, a device for providing audio and/or video content to a media rendering device over a physical connection and controlling one or more wireless lighting devices to render light effects based on an analysis of said audio and/or video content while said audio and/or video content is being rendered on said media rendering device comprises at least one input interface, at least one output interface, and at least one processor configured to obtain relative distance information via said at least one input interface, said relative distance information being indicative of distances between said device and each of a plurality of wireless lighting devices, select, based on said relative distance information, said one or more wireless lighting devices from said plurality of wireless lighting devices, perform said analysis of said audio and/or video content, determine said light effects based on said analysis of said audio and/or video content, and control, via said at least one output interface, said selected one or more wireless lighting devices to render said light effects.

The device is arranged for providing audio and/or video content to a media rendering device over a physical connection, said physical connection may comprise a cable, such as a HDMI cable, having a predetermined length limit. Said cable is limited in length, due to, for example practical purposes or due to limitations in the standard with which the cable complies (e.g. a length limitation based on the transmission standard, such as HDMI, used between the device and the rendering device). As such, the device will be positioned close to the rendering device and wireless lighting devices that are close to the device are therefore also close to the rendering device.

The device may be arranged to provide the audio and/or video content to the media rendering device over one of multiple connections. For example, the device may provide both a wireless connection as well as said physical connection. The selection of said one or more wireless lighting devices may then be conditional on said device being connected to said media rendering device or delivering said audio and/or video content to said media rendering device via said physical connection. When said device is connected wirelessly to said media rendering device, e.g. using a WiFi connection, the user may be requested to indicate which wireless lighting devices are to be used for rendering the light effects, as the device need not be close to the media rendering device. Of course, if the wireless connection is of a type which requires that the device and the media rendering device are close together, the wireless lighting devices may again be selected in a similar of the same manner as where the connection a physical connection.

In an embodiment, the processor may thus further be configured to determine whether the connection over which the device provides audio and/or video content to the medio rendering device is a connection of a type which requires the device and the media rendering device to be proximate, or in other words the distance between the device and the media rendering device to be no greater than a predetermined maximum distance. The processor is then configured to select, based on said relative distance information, said one or more wireless lighting devices from said plurality of wireless lighting devices such that said distance between said device and each of said selected one or more wireless lighting devices do not exceed a threshold, on the condition that the device and the media rendering device are proximate. In another embodiment, the distance between the device and the media rendering device may be determined and the threshold used for selecting said one or more wireless lighting devices from said plurality of wireless lighting devices is determined based on said determined distance between the device and the media rendering device. As an example, the threshold may be the same as the determined distance, or the threshold may be a first value if the determined distance is below a first predetermined distance and a second value otherwise, or the threshold may be calculated based on a predetermined formula which formula takes the determined distance as input (e.g. the threshold is a factor, such as half or double, the determined distance).

By automatically adding (entertainment) lighting devices which are installed close to the device, e.g. an HDMI module, to an already existing or a new entertainment area, configuration of the entertainment mode is simplified. Afterwards, the user can drag and drop the lighting devices to their respective positions relative to the display device if he wishes, but he does not need to do this for lighting devices which are installed too far away from the device. By using proximity detection, it is not necessary to have the user scroll through all his lighting devices and select which ones should be included in the entertainment area. The proximity of lighting devices to the device may be detected using Zigbee or Bluetooth (proximity) technology or using more advanced Bluetooth beaconing, for example. As the Hue Play HDMI Sync Box and many new Hue lighting devices are capable of transmitting and receiving Bluetooth signals, this functionality can be implemented relatively cheaply in the Hue Play HDMI Sync Box.

It is beneficial to only automatically add entertainment(-capable) lighting devices, because a user will normally not want to have entertainment areas with non-entertainment lighting devices. The device may therefore check the type and/or capability of a wireless lighting device before automatically adding it.

Said at least one processor may be configured to receive radio frequency signals from said plurality of wireless lighting devices and said relative distance information may comprise signal strengths of said radio frequency signals and/or channel state information associated with said radio frequency signals. Signal strength and channel state information (CSI) are normally indicative of distance. Alternatively, the relative distance information may comprise another measure of signal quality or may comprise distances estimated based on signal quality, for example.

Said at least one processor may be configured to select said one or more wireless lighting devices from said plurality of wireless lighting devices such that said distances between said device and said selected one or more wireless lighting devices do not exceed a threshold. For example, said threshold may expressed be in meters if physical distances are measured or signal quality measurements are translated into physical distances. Alternatively, said threshold may be expressed in a measure of signal quality, e.g. −50 dBm is signal strength is used as measure of signal quality.

Said at least one processor may be configured to store a definition of an entertainment area in a memory, said entertainment area comprising said selected one or more wireless lighting devices. A definition of an entertainment area may be stored to prevent that proximity detection needs to be each time the device is (re) started and/or to enable an app to determine for which lighting devices it should ask a user to indicate positions, which could then be stored in the entertainment area definition.

Said at least one processor may be configured to obtain, via said at least one input interface, positions of said selected one or more wireless lighting devices. Said at least one processor may be configured to determine said light effects for said selected one or more wireless lighting devices by determining a light effect for a respective wireless lighting device based on said analysis of said audio and/or video content and said position of said respective wireless lighting device. By obtaining the positions of the selected wireless lighting device(s) and using these positions when determining the light effects, the entertainment experience can be improved.

The positions of the selected one or more wireless lighting devices may be obtained automatically or based on user input. Obtaining the positions automatically reduces the effort required by the user the most, but proximity detection is normally not sufficient to determine position, as it is normally not possible to determine the direction from which RF transmissions are received. Instead, more advanced technology may need to be used.

An example of such a technology is beaconing. If enough beacons transmit RF signals, triangulation may be used to determine relative positions. The lighting devices and other devices with a wireless transceiver, e.g. the system itself, may function as beacons. The lighting devices may also take a more active role and not (just) transmit beacons. If, for example, an entertainment area exists with a certain amount of lighting devices whose locations were determined correctly when they were installed and which can determine their proximity to new devices, this data may be used to determine the locations of these new devices. In this way, it will not only be up to the device, e.g. HDMI module, to determine the locations of the new devices, but also the lighting devices will be involved in triangulating the locations of the new devices more accurately.

If automatically obtaining the positions is not possible, the user is preferably enabled to indicate the positions manually. Since this only needs to be performed for the wireless lighting devices that have been detected in proximity to the device, this is still simpler than the conventional process of configuring the entertainment mode.

Said positions may be indicative of a distance and orientation of each of said one or more wireless lighting devices relative to said device or to said media rendering device and/or said positions may be indicative of a distance and orientation of each of said one or more wireless lighting devices relative to other wireless lighting devices of said one or more wireless lighting devices.

Positions relative to a display device make it possible to determine which analysis region of the video content to analyze for creating light effects and thereby create a surround light experience similar to surround sound. Lighting devices close to each other may be controlled in a coordinated manner to create a coherent light experience. It may not be possible to determine positions relative to the media rendering device automatically, but as the device is normally located near the media rendering device, positions relative to the device may be used instead.

In a second aspect of the invention, a method of controlling one or more wireless lighting devices to render light effects based on an analysis of audio and/or video content while said audio and/or video content is being rendered on a media rendering device comprises obtaining relative distance information, said relative distance information being indicative of distances between a device which provides said audio and/or video content to said media rendering device over a physical connection and each of a plurality of wireless lighting devices, selecting, based on said relative distance information, said one or more wireless lighting devices from said plurality of wireless lighting devices, performing said analysis of said audio and/or video content, determining said light effects based on said analysis of said audio and/or video content, and controlling said selected one or more wireless lighting devices to render said light effects. Said method may be performed by software running on a programmable device. This software may be provided as a computer program product.

Moreover, a computer program for carrying out the methods described herein, as well as a non-transitory computer readable storage-medium storing the computer program are provided. A computer program may, for example, be downloaded by or uploaded to an existing device or be stored upon manufacturing of these systems.

A non-transitory computer-readable storage medium stores at least one software code portion, the software code portion, when executed or processed by a computer, being configured to perform executable operations for controlling one or more wireless lighting devices to render light effects based on an analysis of audio and/or video content while said audio and/or video content is being rendered on a media rendering device.

The executable operations comprise obtaining relative distance information, said relative distance information being indicative of distances between a device which provides said audio and/or video content to said media rendering device over a physical connection and each of a plurality of wireless lighting devices, selecting, based on said relative distance information, said one or more wireless lighting devices from said plurality of wireless lighting devices, performing said analysis of said audio and/or video content, determining said light effects based on said analysis of said audio and/or video content, and controlling said selected one or more wireless lighting devices to render said light effects.

As will be appreciated by one skilled in the art, aspects of the present invention may be embodied as a device, a method or a computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit", "module" or "system." Functions described in this disclosure may be implemented as an algorithm executed by a processor/microprocessor of a computer. Furthermore, aspects of the present invention may take the form of a computer program product embodied in one or more computer readable medium(s) having computer readable program code embodied, e.g., stored, thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples of a computer readable storage medium may include, but are not limited to, the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of the present invention, a computer readable storage medium may be any tangible medium that can contain, or store, a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber, cable, RF, etc., or any suitable combination of the foregoing. Computer program code for carrying out operations for aspects of the present invention may be written in any combination of one or more programming languages, including an object oriented programming language such as Java™, Smalltalk, C++ or the like and conventional procedural programming languages, such as the "C" programming language or similar programming languages. The program code may execute entirely on a local computer, partly on the local computer, as a stand-alone software package, partly on the local computer and partly on a remote computer, or entirely on the remote computer or server. In the latter scenario, the remote computer may be connected to the local computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems), and computer program products according to embodiments of the present invention. It will be understood that each block of the flowchart illustrations and/or block diagrams, and combinations of blocks in the flowchart illustrations and/or block diagrams, can be implemented by computer program instructions. These computer program instructions may be provided to a processor, in particular a microprocessor or a central processing unit (CPU), of a general purpose computer, special purpose computer, or other programmable data processing apparatus to produce a machine, such that the instructions, which execute via the processor of the computer, other programmable data processing apparatus, or other devices create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the figures illustrate the architecture, functionality, and operation of possible implementations of devices, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the blocks may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustrations, and combinations of blocks in the block diagrams and/or flowchart illustrations, can be implemented by special purpose hardware-based systems that perform the specified functions or acts, or combinations of special purpose hardware and computer instructions.

BRIEF DESCRIPTION OF THE DRAWINGS

These and other aspects of the invention are apparent from and will be further elucidated, by way of example, with reference to the drawings, in which:

FIG. 5 shows representations of distances between the system and the lighting devices in the space of FIG. 2;

FIGS. 6-7 show examples of a user interface for defining an entertainment area.

Corresponding elements in the drawings are denoted by the same reference numeral.

DETAILED DESCRIPTION OF THE EMBODIMENTS

Figure 1:
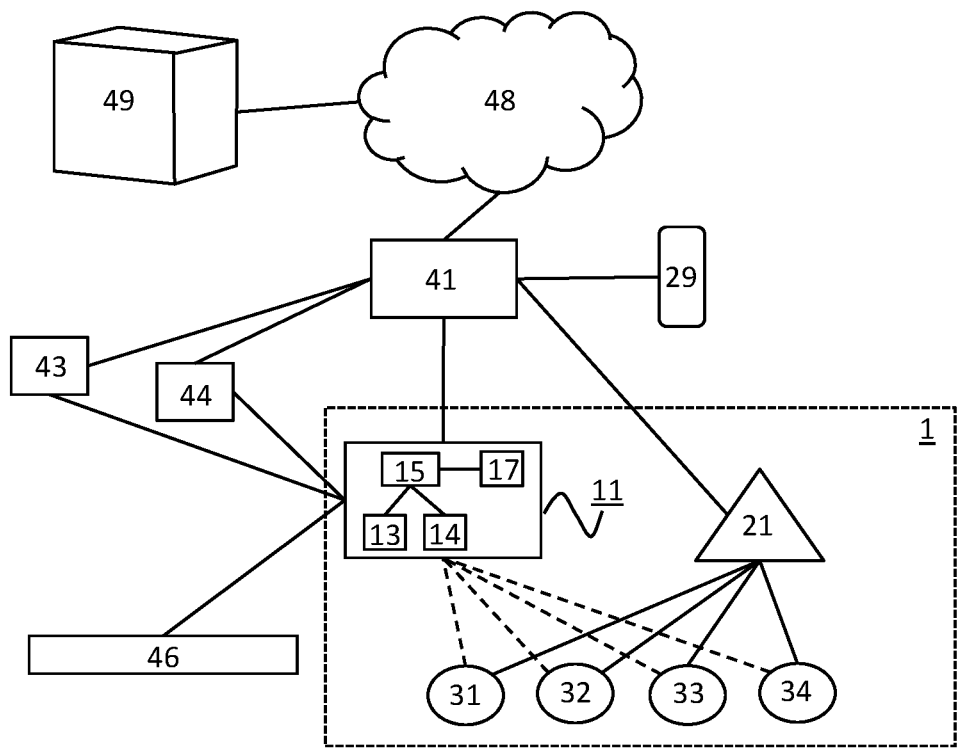
FIG. 1 is a block diagram of a first embodiment of the system.

FIG. 1 shows a first embodiment of the system for providing audio and/or video content to a media rendering device over a physical connection and controlling one or more wireless lighting devices to render light effects based on an analysis of the audio and/or video content while the audio and/or video content is being rendered on the media rendering device: HDMI module 11. The HDMI module 11 may be a Hue Play HDMI Sync Box, for example.

In the example of FIG. 1, the audio and/or video content is rendered on a media rendering device 46, e.g. a TV. Alternatively, the audio and/or video content may be rendered on multiple media rendering devices, e.g. a video wall. In the example of FIG. 1, the HDMI module 11 is part of a lighting system 1. The lighting system 1 further comprises a bridge 21 and four wireless lighting devices 31-34. The bridge 21 may be a Hue bridge and the lighting devices 31-34 may be Hue lamps, for example. The HDMI module 11 can control the lighting devices 31-34 via the bridge 21. The bridge 21 communicates with the lighting devices 31-34 using a wireless communication protocol like e.g. Zigbee.

The HDMI module 11 is connected to a wireless LAN access point 41, e.g. using Wi-Fi. The bridge 21 is also connected to the wireless LAN access point 41, e.g. using Wi-Fi or Ethernet. In the example of FIG. 1, the HDMI module 11 communicates to the bridge 21 via the wireless LAN access point 41, e.g. using Wi-Fi. Alternatively or additionally, the HDMI module 11 may be able to communicate directly with the bridge 21 e.g. using Zigbee, Bluetooth or Wi-Fi technology, and/or may be able to communicate with the bridge 21 via the Internet/cloud. The wireless LAN access point 41 is connected to the Internet 48. A media server 49 is also connected to the Internet 48. Media server 49 may be a server of a video-on-demand service such as Netflix, Amazon Prime Video, Hulu, Disney+ or Apple TV+, for example.

The HDMI module 11 is connected to the media rendering device 46 and local media receivers 43 and 44 via HDMI. The local media receivers 43 and 44 may comprise one or more streaming or content generation devices, e.g. an Apple TV, Microsoft Xbox One and/or Sony PlayStation 4, and/or one or more cable or satellite TV receivers. Each of the local media receivers 43 and 44 may be able to receive content from media server 49 and/or from a media server in the home network.

The HDMI module 11 comprises a receiver 13, a transmitter 14, a processor 15, and memory 17. The processor 15 is configured to obtain relative distance information via the receiver 13. This relative distance information is indicative of distances between the HDMI module 11 and each of the wireless lighting devices 31-34. The processor 15 is further configured to select, based on the relative distance information, one or more of the wireless lighting devices 31-34, perform the analysis of the audio and/or video content, determine the light effects based on the analysis of the audio and/or video content, and control, via the transmitter 14, the selected one or more wireless lighting devices to render the light effects. In the embodiment of FIG. 1, the processor 15 is configured to receive radio frequency signals, e.g. Zigbee, Bluetooth or Wi-Fi signals, transmitted by the wireless lighting devices 31-34 and obtain the relative distance information based on the received radio frequency signals. The relative distance information may comprise signal strengths of the radio frequency signals and/or channel state information associated with the radio frequency signals, for example. For instance, a wireless lighting device may be selected for inclusion in the entertainment area if the RSSI exceeds a certain threshold, e.g. is higher/stronger than −50 dBm.

Determining based on relative distance information which lighting device(s) should be used for rendering entertainment light effects may be performed when the user starts using the entertainment mode with his existing lighting devices and/or may be performed repeatedly after the initial configuration of the entertainment mode has been performed, e.g. each time the user installs a new lighting device. For example, the user may be able to indicate in an app whether lighting devices that are installed should be automatically added to an existing entertainment area. This results in new lighting devices which are installed near the HDMI module 11 being added automatically to an existing entertainment area.

The latter is a feature for instant setup without having to go through the app once new lighting devices are installed. However, users might still want to specify the location of the lighting device relative to a display device in a drag and drop user interface. If the position of each lighting device relative to the display device is known, it is possible to determine the positions of each lighting device relative to each other. This information can be used to optimize the light experience.

In the embodiment of the HDMI module 11 shown in FIG. 1, the HDMI module 11 comprises one processor 15. In an alternative embodiment, the HDMI module 11 comprises multiple processors. The processor 15 of the HDMI module 11 may be a general-purpose processor, e.g. ARM-based, or an application-specific processor. The processor 15 of the HDMI module 11 may run a Unix-based operating system for example. The memory 17 may comprise one or more memory units. The memory 17 may comprise solid-state memory, for example.

The receiver 13 and the transmitter 14 may use one or more wired or wireless communication technologies such as Wi-Fi to communicate with the wireless LAN access point 41 and HDMI to communicate with the media rendering device 46 and with local media receivers 43 and 44, for example. In an alternative embodiment, multiple receivers and/or multiple transmitters are used instead of a single receiver and a single transmitter. In the embodiment shown in FIG. 1, a separate receiver and a separate transmitter are used. In an alternative embodiment, the receiver 13 and the transmitter 14 are combined into a transceiver.

The HDMI module 11 may comprise other components typical for a consumer electronic device such as a power connector. The invention may be implemented using a computer program running on one or more processors. In the embodiment of FIG. 1, the system comprises a single device. In an alternative embodiment, the system comprises multiple devices.

Figure 2:
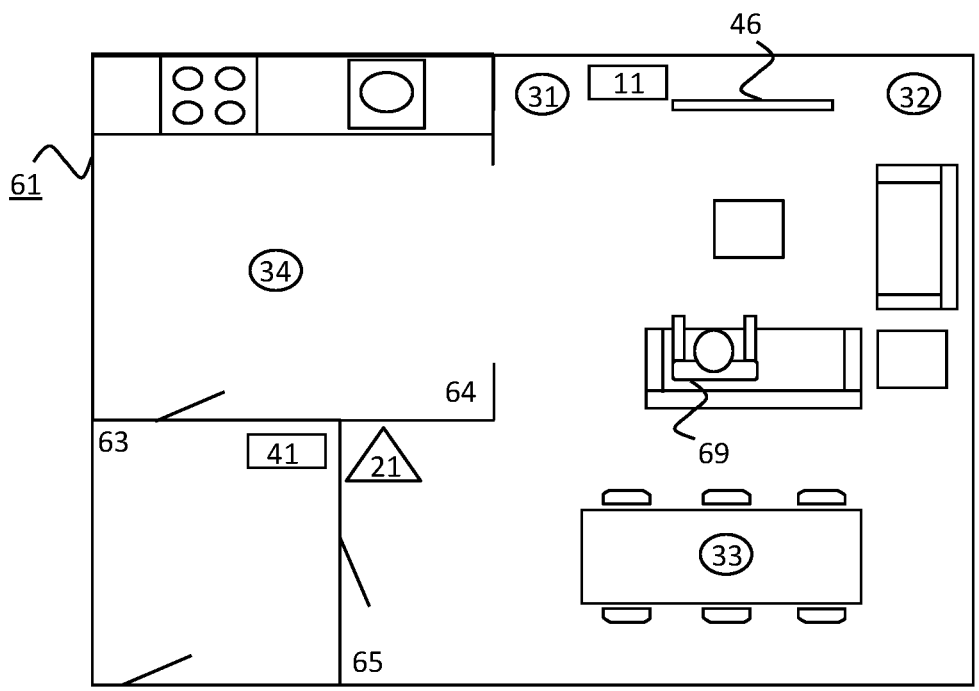
FIG. 2 depicts an example of a space in which the system of FIG. 1 is used.

FIG. 2 depicts an example of a space in which the HDMI module 11 of FIG. 1 is used. A floor 61 of a home comprises a hallway 63, a kitchen 64 and a living room 65. Lighting devices 31-33 have been installed in the living room 65 and lighting device 34 has been installed in the kitchen 64. Lighting device 33 has been installed above a dining table. Lighting devices 31 and 32 have been installed on respectively the left and right side of the media rendering device 46, which may be a TV, for example.

The wireless LAN access point 41 has been installed in the hallway 63. The HDMI module 11 has been installed next to the media rendering device 46 in the living room 65. The bridge 21 has been installed in the living room 65 near the wireless LAN access point 41. A person 69 is watching TV.

Figure 3:
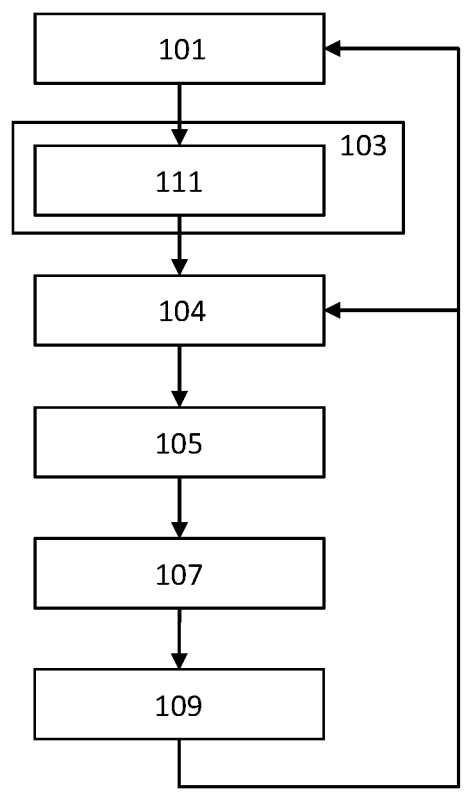
FIG. 3 is a flow diagram of a first embodiment of the method.

A first embodiment of the method of controlling one or more wireless lighting devices to render light effects based on an analysis of audio and/or video content while the audio and/or video content is being rendered on a media rendering device is shown in FIG. 3.

A step 101 comprises obtaining relative distance information. The relative distance information is indicative of distances between a device which provides the audio and/or video content to the media rendering device over a physical connection and each of a plurality of wireless lighting devices.

A step 103 comprises selecting, based on the relative distance information, the one or more wireless lighting devices from the plurality of wireless lighting devices. In the embodiment of FIG. 3, step 103 is implemented by a step 111. Step 111 comprises selecting the one or more wireless lighting devices from the plurality of wireless lighting devices such that the distances between the device and the selected one or more wireless lighting devices do not exceed a threshold.

A step 104 comprises obtaining the audio and/or video content. A step 105 comprises performing the analysis of the audio and/or video content obtained in step 104. A step 107 comprises determining the light effects based on the analysis of the audio and/or video content performed in step 105. A step 109 comprises controlling the one or more wireless lighting devices selected in step 111 to render the light effects determined in step 107.

Figure 4:
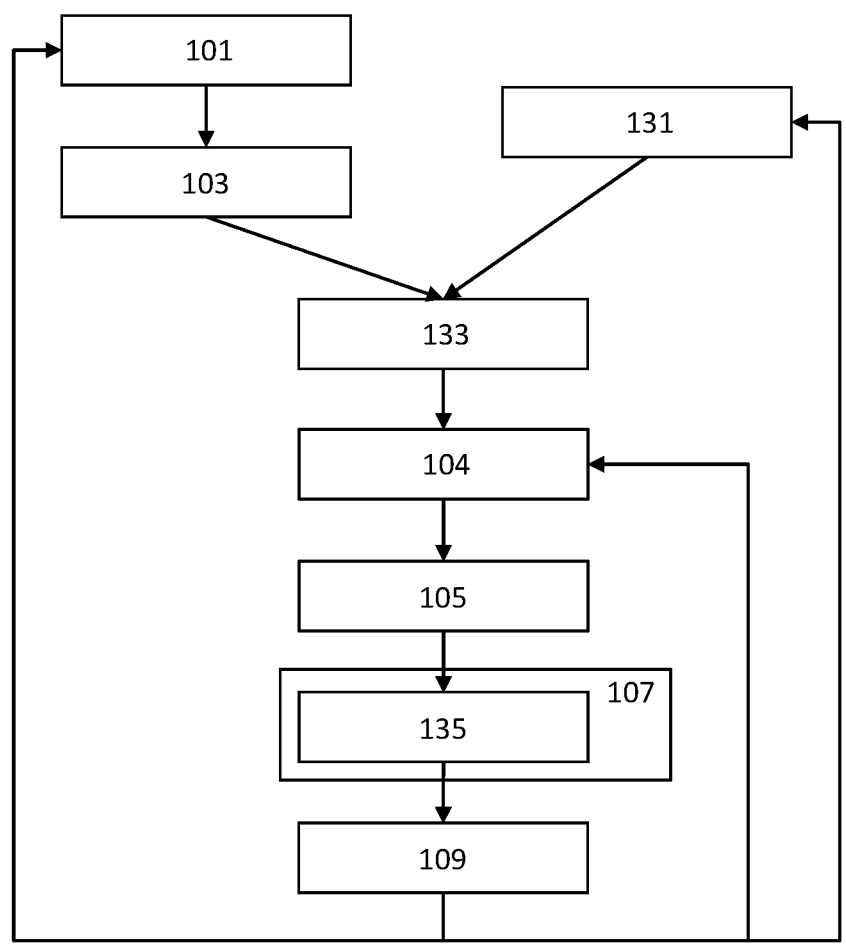
FIG. 4 is a flow diagram of a second embodiment of the method.

A second embodiment of the method of controlling one or more wireless lighting devices to render light effects based on an analysis of audio and/or video content while the audio and/or video content is being rendered on a media rendering device is shown in FIG. 4. In the embodiment of FIG. 4, a step 131 is performed in parallel with steps 101 and 103 of FIG. 3. Step 131 comprises obtaining positions of the plurality of wireless lighting devices.

The positions of the plurality of wireless lighting devices may be relative to the device or to the media rendering device and/or may be relative to other wireless lighting devices of the one or more wireless lighting devices. Preferably, the positions are obtained via a user interface in which the user can specify the locations of the lighting devices relative to the media rendering device. Alternatively, the positions may be obtained automatically, e.g. by using beaconing. In this case, the obtained positions are relative to the device, but as the device is likely near the media rendering device, the positions relative to the device may be used instead of the positions relative to the media rendering device.

Furthermore, in the embodiment of FIG. 4, a step 133 is performed after steps 103 and 131 have been performed. Step 133 comprises storing a definition of an entertainment area in a memory. The entertainment area comprises the one or more wireless lighting devices selected in step 101. The definition includes the positions of the selected wireless lighting devices, as determined in step 131.

In the embodiment of FIG. 4, the positions of all wireless lighting devices are obtained. In an alternative embodiment, only the positions of the selected one or more wireless lighting devices are obtained. In this alternative embodiment, step 131 is performed after step 103. Step 131 may then be performed between steps 103 and 133, for example. If step 131 is performed after step 133, the positions may be added to the definition of the entertainment area in an additional step.

Moreover, in the embodiment of FIG. 4, step 107 of FIG. 3 is implemented by a step 135. Step 135 comprises determining a light effect for a respective wireless lighting device based on the analysis of the audio and/or video content and the position of the respective wireless lighting device. For example, a light effect for a lighting device left of the media rendering device, e.g. a TV, may be based on an analysis region in a left area of the video content and a light effect for a lighting device left of a listening position may be based on a left audio channel of the audio content. Light effects for two nearby lighting devices may be made similar to avoid an incoherent entertainment experience.

The embodiments of FIGS. 3 and 4 differ from each other in multiple aspects, i.e. multiple steps have been added or replaced. In variations on these embodiments, only a subset of these steps is added or replaced and/or one or more steps is omitted. As an example, step 111 may be added to the embodiment of FIG. 4 or step 133 may be added to the embodiment of FIG. 3.

FIG. 5 shows representations of the distances between the HDMI module 11 and the wireless lighting devices 31-34 in the space of FIG. 2. The obtained relative distance information 201-204 is indicative of these distances. The relative distance information may comprise the shortest physical distance between these devices, e.g. if physical distances are measured using infrared or ultrasound distance sensors, but the relative distance information will more likely comprise a measure of signal quality (e.g. RSSI) or be determined based on such a measure. In that case, the relative distance information is also indicative of the physical distances, but will it normally not be possible to determine the exact physical distances from the relative distance information, as signal quality may not be directly proportional to physical distance (e.g. due to walls).

In the example of FIG. 5, the distances represented by lines 201 and 202 are much shorter than the distances represented by lines 203 and 204 and only the wireless lighting devices 31 and 32 are selected.

The examples of FIGS. 6 and 7 show a user interface for defining an entertainment area displayed on a display 221 of the mobile device 29 of FIG. 1. In these examples, the wireless lighting devices 31 and 32 of FIG. 1 have been selected based on the obtained relative distance information. In the user interface, the living room of the user is depicted. In the living room representation, an icon 231 representing a TV and an icon 233 representing a couch are depicted.

In the example of FIG. 6, two icons 237-238 representing the wireless lighting devices 31 and 32 are placed in a box 235. This indicates that the positions of these lighting devices have not been obtained yet. The user can now drag the icons 237 and 238 to the correct positions in the depicted living room. The positions of the lighting devices relative to the TV represented by icon 231 and/or the positions of the lighting devices relative to each other may then be taken into account when determining the light effects to be rendered.

In an alternative example, a circle around the TV or part thereof is shown in the user interface per lighting device to help the user determine where to drag the icons 237 and 238 to. The radius of each circle is determined based on the relative distance information and reflects the distance of the lighting device to the TV. The icons 237 and 238 may then be placed on the respective circles instead of in the box 235, for example.

In the example of FIG. 7, the two icons 237-238 representing the wireless lighting devices 31 and 32 are shown at positions in the depicted living room. The user may have dragged them there or the positions may have been obtained automatically, e.g. using (Bluetooth) beaconing. The user can now drag the icons 237 and 238 to another position in the depicted living room or remove them from the entertainment area. When the user has finished, the definition of the entertainment area can be stored in a memory.

Figure 8:
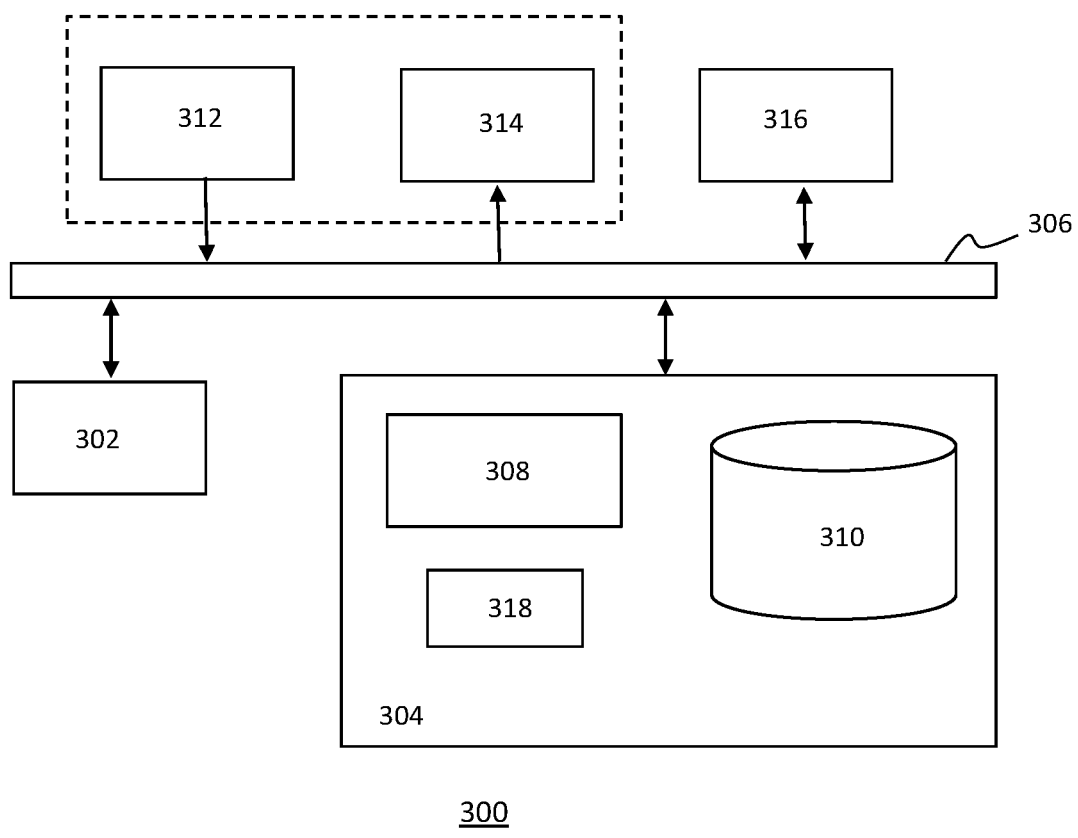
FIG. 8 is a block diagram of an exemplary data processing system for performing the method of the invention.

FIG. 8 depicts a block diagram illustrating an exemplary data processing system that may perform the method as described with reference to FIGS. 3 and 4

As shown in FIG. 8, the data processing system 300 may include at least one processor 302 coupled to memory elements 304 through a system bus 306. As such, the data processing system may store program code within memory elements 304. Further, the processor 302 may execute the program code accessed from the memory elements 304 via a system bus 306. In one aspect, the data processing system may be implemented as a computer that is suitable for storing and/or executing program code. It should be appreciated, however, that the data processing system 300 may be implemented in the form of any system including a processor and a memory that is capable of performing the functions described within this specification.

The memory elements 304 may include one or more physical memory devices such as, for example, local memory 308 and one or more bulk storage devices 310. The local memory may refer to random access memory or other non-persistent memory device(s) generally used during actual execution of the program code. A bulk storage device may be implemented as a hard drive or other persistent data storage device. The processing system 300 may also include one or more cache memories (not shown) that provide temporary storage of at least some program code in order to reduce the quantity of times program code must be retrieved from the bulk storage device 310 during execution. The processing system 300 may also be able to use memory elements of another processing system, e.g. if the processing system 300 is part of a cloud-computing platform.

Input/output (I/O) devices depicted as an input device 312 and an output device 314 optionally can be coupled to the data processing system. Examples of input devices may include, but are not limited to, a keyboard, a pointing device such as a mouse, a microphone (e.g. for voice and/or speech recognition), or the like. Examples of output devices may include, but are not limited to, a monitor or a display, speakers, or the like. Input and/or output devices may be coupled to the data processing system either directly or through intervening I/O controllers.

In an embodiment, the input and the output devices may be implemented as a combined input/output device (illustrated in FIG. 8 with a dashed line surrounding the input device 312 and the output device 314). An example of such a combined device is a touch sensitive display, also sometimes referred to as a "touch screen display" or simply "touch screen". In such an embodiment, input to the device may be provided by a movement of a physical object, such as e.g. a stylus or a finger of a user, on or near the touch screen display.

A network adapter 316 may also be coupled to the data processing system to enable it to become coupled to other systems, computer systems, remote network devices, and/or remote storage devices through intervening private or public networks. The network adapter may comprise a data receiver for receiving data that is transmitted by said systems, devices and/or networks to the data processing system 300, and a data transmitter for transmitting data from the data processing system 300 to said systems, devices and/or networks. Modems, cable modems, and Ethernet cards are examples of different types of network adapter that may be used with the data processing system 300.

As pictured in FIG. 8, the memory elements 304 may store an application 318. In various embodiments, the application 318 may be stored in the local memory 308, the one or more bulk storage devices 310, or separate from the local memory and the bulk storage devices. It should be appreciated that the data processing system 300 may further execute an operating system (not shown in FIG. 8) that can facilitate execution of the application 318. The application 318, being implemented in the form of executable program code, can be executed by the data processing system 300, e.g., by the processor 302. Responsive to executing the application, the data processing system 300 may be configured to perform one or more operations or method steps described herein.

Various embodiments of the invention may be implemented as a program product for use with a computer system, where the program(s) of the program product define functions of the embodiments (including the methods described herein). In one embodiment, the program(s) can be contained on a variety of non-transitory computer-readable storage media, where, as used herein, the expression "non-transitory computer readable storage media" comprises all computer-readable media, with the sole exception being a transitory, propagating signal. In another embodiment, the program(s) can be contained on a variety of transitory computer-readable storage media. Illustrative computer-readable storage media include, but are not limited to: (i) non-writable storage media (e.g., read-only memory devices within a computer such as CD-ROM disks readable by a CD-ROM drive, ROM chips or any type of solid-state non-volatile semiconductor memory) on which information is permanently stored; and (ii) writable storage media (e.g., flash memory, floppy disks within a diskette drive or hard-disk drive or any type of solid-state random-access semiconductor memory) on which alterable information is stored. The computer program may be run on the processor 302 described herein.

The terminology used herein is for the purpose of describing particular embodiments only and is not intended to be limiting of the invention. As used herein, the singular forms "a," "an," and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of embodiments of the present invention has been presented for purposes of illustration, but is not intended to be exhaustive or limited to the implementations in the form disclosed. Many modifications and variations will be apparent to those of ordinary skill in the art without departing from the scope and spirit of the present invention. The embodiments were chosen and described in order to best explain the principles and some practical applications of the present invention, and to enable others of ordinary skill in the art to understand the present invention for various embodiments with various modifications as are suited to the particular use contemplated

The invention claimed is:

1. A device arranged for providing audio and/or video content to a media rendering device over a physical connection and further arranged for controlling one or more wireless lighting devices of a plurality of wireless lighting devices to render light effects based on an analysis of said audio and/or video content while said audio and/or video content is being rendered on said media rendering device, said device comprising:
at least one input interface;
at least one output interface; and
at least one processor configured to:
obtain distance information via said at least one input interface, said distance information being indicative of distances between said device and each of said plurality of wireless lighting devices,
select, based on said distance information, said one or more wireless lighting devices from said plurality of wireless lighting devices, such that said distance between said device and each of said selected one or more wireless lighting devices do not exceed a threshold,
perform said analysis of said audio and/or video content,
determine said light effects based on said analysis of said audio and/or video content, and
control, via said at least one output interface, said selected one or more wireless lighting devices to render said light effects.

2. A device as claimed in claim 1, wherein said at least one processor is configured to receive radio frequency signals from said plurality of wireless lighting devices and said distance information comprises signal strengths of said radio frequency signals and/or channel state information associated with said radio frequency signals.

3. A device as claimed in claim 1, wherein said at least one processor is configured to store a definition of an entertainment area in a memory, said entertainment area comprising said selected one or more wireless lighting devices.

4. A device as claimed in claim 1, wherein said at least one processors is configured to obtain, via said at least one input interface, positions of said selected one or more wireless lighting devices.

5. A device as claimed in claim 4, wherein said at least one processor is configured to determine said light effects for said selected one or more wireless lighting devices by determining a light effect for a respective wireless lighting device based on said analysis of said audio and/or video content and said position of said respective wireless lighting device.

6. A device as claimed in claim 4, wherein said positions are indicative of a distance and orientation of each of said one or more wireless lighting devices relative to said device or to said media rendering device.

7. A device as claimed in claim 4, wherein said positions are indicative of a distance and orientation of each of said one or more wireless lighting devices relative to other wireless lighting devices of said one or more wireless lighting devices.

8. A method of controlling one or more wireless lighting devices of a plurality of wireless lighting devices to render light effects based on an analysis of audio and/or video content while said audio and/or video content is being rendered on a media rendering device, said method comprising:
   obtaining distance information, said distance information being indicative of distances between a device which provides said audio and/or video content to said media rendering device over a physical connection and each of said plurality of wireless lighting devices;
   selecting, based on said distance information, said one or more wireless lighting devices from said plurality of wireless lighting devices, such that said distance between said device and each of said selected one or more wireless lighting devices do not exceed a threshold;
   performing said analysis of said audio and/or video content;
   determining said light effects based on said analysis of said audio and/or video content; and
   controlling said selected one or more wireless lighting devices to render said light effects.

9. A non-transitory computer-readable medium on which are stored a plurality of non-transitory computer-readable instructions that when executed on a processor are configured to perform the steps comprising the method as defined in claim 8.

* * * * *